United States Patent Office 3,427,289
Patented Feb. 11, 1969

3,427,289
CONTROLLED ANIONIC POLYMERIZATION
OF HIGHER LACTAMS
Robert Edmund Warner, Hendersonville, N.C., assignor to The Polymer Corporation, Reading, Pa., a corporation of Pennsylvania
No Drawing. Continuation-in-part of application Ser. No. 261,473, Feb. 27, 1963. This application Mar. 14, 1967, Ser. No. 622,942
U.S. Cl. 260—78          11 Claims
Int. Cl. C08g 20/18

ABSTRACT OF THE DISCLOSURE

In the anionic polymerization of a higher lactam, the elapsed time between initiation of the polymerization and the formation of a viscous polymer is controllably extended by selecting at least two different promoters that are effective at different temperatures.

---

This invention is a continuation-in-part of my copending application Ser. No. 261,473, filed Feb. 27, 1963, now abandoned, and relates to improvements in methods for initiating polymerization reactions when polymerizing higher lactams by use of low temperature anionic processes. More particularly, this invention relates to methods for controlling the time in which the polymerizing lactams are in a viscous state.

The low temperature anionic polymerization of lactams referred to above is disclosed, for example, in U.S. Patents 3,015,652; 3,017,391; 3,017,392 and 3,018,273.

Briefly, the above patents disclose the novel polymerization of higher lactams, i.e., lactams containing at least 6 carbon atoms in the lactam ring, as for example, e-caprolactam, enantholactam, caprylolactam, decanolactam, undecanolactam, dodecanolactam, pentadecanolactam, hexadecanolactam, methylcyclohexanone isoximes, cyclic hexamethylene adipamide, and the like, and mixtures thereof; in the presence of an anionic polymerization catalyst, as for example, alkali and alkaline earth metals such as lithium, sodium, potassium, magnesium, calcium, strontium, etc., either in metallic form or in the form of hydrides, borohydrides, oxides, hydroxides, carbonates, etc., organo-metallic derivatives of the foregoing metals, as well as other metals, such as butyl lithium, ethyl potassium, propyl sodium, phenyl sodium, triphenylmethyl sodium, diphenyl magnesium, diethyl zinc, triisopropyl aluminum, diisobutyl aluminum hydride, sodium amide, magnesium amide, magnesium anilide, Grignard reagent compounds, such as ethyl magnesium chloride, methyl magnesium bromide, phenyl magnesium bromide, and the like; and a promoter compound such as organic isocyanates, ketenes, acid chlorides, acid anhydrides, and N-substituted imide having the structural formula

wherein A is an acyl radical such as carbonyl, thiocarbonyl, sulfonyl, phosphinyl and thiophosphinyl radicals, B is an acyl radical of the group A and nitroso, R is a radical such as A, hydrocarbyl, and heterocyclic radicals and derivatives thereof, wherein said radicals in turn can contain radicals such as carbonyl, thiocarbonyl, sulfonyl, nitroso, phosphinyl, thiophosphinyl, tert.-amino, acylamido, N-substituted carbamyl, N-substituted carbamido, alkoxy, ether groups and the like, A and B, or A and R, together can form a ring system through a divalent linking group, and any free valence bond of the A and B radicals can be hydrogen or R, excepting A directly linked thereto, and the promoter compound preferably has a molecular weight of less than about 1,000.

This polymerization of the higher lactams is initiated at temperatures of from about the melting point of the lactam monomer to about 250° C., and preferably from about 120° to about 200° C. As the reaction is exothermic, the initiation temperature will be exceeded under most conditions. The amount of catalyst and promoter compound each can vary from about 0.01 to about 20 mole percent, preferably from about 0.05 to about 5 mole percent, and more preferably still from about 0.1 to about 1 mole percent, all based on the higher lactam being polymerized. The higher lactams preferably contain from 6 to 20 carbon atoms, and more preferably contain from 6 to 12 carbon atoms. The anionic catalyst preferably is a Grignard compound or an alkali metal and hydrides thereof. It will be understood that the anionic catalyst can be reacted in stoichiometric amount with a higher lactam to form a salt thereof, such as sodium caprolactam, and said salt can then be employed in the polymerization process in an equivalent amount to the anionic catalyst as set out hereinabove. This preliminary preparation is particularly desirable as it permits ready removal of hydrogen gas from the system as when sodium or sodium hydride is employed, removal of water as when sodium hydroxide is employed, removal of water and carbon dioxide as when sodium carbonate is employed, etc. Isocyanates and N-substituted imides are the preferred promoter compounds. It will be understood that the use of acid chlorides effects the presence of HCl in the system which preferably is removed therefrom to preclude reaction with the anionic catalyst, whereby extra catalyst would otherwise be required. Similarly, acid anhydrides generate organic acids in the system which then require sufficient anionic catalyst to neutralize the organic acid in addition to the amount desired to function in the polymerization reactions.

In the above anionic polymerization processes, the reaction may proceed with great rapidity. It is possible, for example, to produce a form stable polymer within 10 to 20 seconds from the time the polymerization reaction has been initiated. After the polymerization has been initiated, the viscosity of the polymerizing mass rapidly increases from the low viscosity of the monomer to a high viscosity polymer that can no longer readily be poured or cannot readily be deformed. For purposes herein, the term "viscous range" will be used to describe the state of the polymerizing mass after an initial increase in viscosity is observable but before the viscosity has increased to that degree whereat the polymerizing mass is no longer pourable or readily deformable. Generally, this viscous range will encompass a range of from about 20 to about 400 poise. The "time of the viscous range" is, therefore, the difference between the elapsed time from initiation of the polymerization reaction to the time a highly viscous polymer is formed that is no longer pourable or readily deformable and the elapsed time from initiation of the polymerization reaction to the time an increase in viscosity is observable.

As it is often desirable, particularly when casting or otherwise forming polylactam articles simultaneously with polymerization, to perform certain operations, such as charging molds with lactams, while the polymerizing mass is in the viscous range, it is the object of this invention to control and/or increase the time of the viscous range.

Within any given catalyst and promoter system, the time of the viscous range may be controlled to some extent by varying the initiation temperature. The time of the viscous range is, within limits, an inverse function of the initiation temperature; i.e., the time decreases with increasing temperatures. This does not provide much latitude, however, for if the initiation temperature is lowered out of a comparatively narrow range, incomplete conversion, poor cast surfaces, or precipitation of powdery lactams may variously result.

Similarly, it is possible to vary the time in the viscous range by altering the quantity of catalyst and/or promoter. This, too, can only be adjusted within certain limits, as too little quantities may result in incomplete conversion and too great quantities may have adverse effects upon the physical properties of the resulting polymer.

It has now been discovered that if at least two different promoters that are effective to initiate the polymerization at different temperatures are used, a closer approach to the desirable control of time of the viscous range can be achieved. In such a system, a first promoter is selected for its ability to initiate the polymerization reaction at a lower temperature than the second promoter.

To understand the basis of this invention, it is pointed out that the reaction mechanism of base-catalyzed polymerization of lactams is considerably different from the aqueous polymerization of lactams as may be practiced in the commercial production of nylon 6 from caprolactam. The aqueous polymerization involves hydrolysis of the lactam with water to form a linear amino acid, followed by condensation of the amino groups and carboxyl groups to form a linear polyamide. In contrast thereto, the base-catalyzed polymerization of lactam is carried out in the complete absence of water, without formation of amino acids. The initial mechanisms of the base-catalyzed polymerization of caprolactam may be represented as follows:

(1) Primary initiation

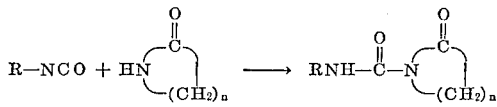

(2) Polymerization initiation

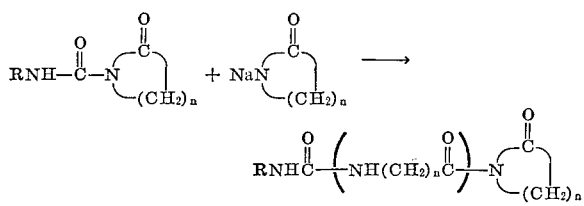

(3) Propagation of polymer chain

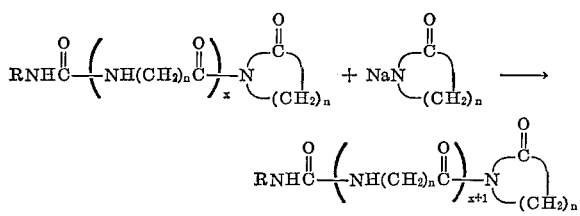

The above reactions will continue indefinitely, as the sodium atom is repeatedly transferred to a new lactam monomer molecule that in turn becomes attached to the polymeric chain by opening a lactam ring at the end of the molecule. It will be observed that three separate reactions are involved. The first equation illustrates the primary initiation by the reaction of the promoter compound with the lactam monomer to form the initiation species. This reaction proceeds quite readily at comparatively low temperatures.

The second equation illustrates the initiation of the polymerization wherein the initiation species reacts with a catalyzed monomer molecule to cleave the lactam ring and start the initial growth of the polymeric chain. This reaction will proceed only above a minimum temperature that is largely determined by the R group in the RNCO promoter compound.

The propagation of the polymeric chain as illustrated by Equation 3 proceeds rapidly at an energy level less than that required in Equation 2. For this reason, in the anionic polymerization of lactams, the rate determining step of the reaction is the reaction illustrated by Equation 2. After the energy level is sufficiently high to cause the reaction illustrated by Equation 2 to take place, the minimum energy level in the system is then at such a level that the reaction of the growing chains with catalyzed lactam monomer is self-sustaining and is no longer influenced by the nature of the R group at the other end of the chain. Thus, the propagation reaction (Equation 3) will be influenced solely by the catalyst species and the nature of the lactam end group on the growing chain.

As noted above, the polymerization initiation illustrated by Equation 2 takes place at a rather specific minimum temperature that is dependent largely upon the R group of the promoter compound. For convenience, this minimum temperature required to cause the reaction to take place is referred to herein as the "Activation temperature." Stated somewhat differently, the activation temperature may also be defined rather arbitrarily as that temperature at which the promoter species will be effective to enable the polymerization reaction to proceed autogenously under substantially adiabatic conditions.

Quite generally, promoter compounds in which R is an aliphatic radical have comparatively low activation temperatures. Having slightly higher activation temperatures are the difunctional and polyfunctional aromatic isocyanates. Still further up on the scale of activation temperatures are the monofunctional aromatic isocyanates, and continuing further, the class of promoters that have possibly the highest activation temperatures are the ureas and urethanes. (For a comprehensive listing of suitable isocyanate promoter compounds, see U.S. Patent 3,028,369 and for urea and urethane promoter compounds, see U.S. Patent 3,086,962 which are included herein by reference.)

While the discussion of promoter compounds herein is primarily based upon isocyanates, it should be appreciated that the invention is not so limited, but relates to any of the promoter compounds that are capable of forming the N-substituted imides as previously discussed above. Also, while the activation temperatures for given promoter compounds have not been specifically listed, the determination of an activation temperature with regard to any specific promoter may readily be determined by one skilled in the art, and a rather good preliminary estimate of the approximate activation temperature can be made by considering, as noted above, whether the R group is aromatic or aliphatic and whether an isocyanate is mono or polyfunctional.

As has been stated, different promoter compounds have different activation temperatures; however, after the activation temperature is reached and the rate determining reaction has transpired (Equation 2), the polymerization reaction will proceed at a rate independent of the type of promoter compound used. The speed at which the reaction will proceed, when once initiated, will be a function of the number of available polymerization sites multiplied by the reaction constant for the polymerization. As the number of available sites will in turn be dependent on the quantity of promoter used, and as the reaction speed will be a function of the reaction constant times the reaction temperature, it may quite simply be stated that the rate of polymerization (after the activation temperature has been reached) will be dependent upon the amount of promoter compound used and the temperature of the polymerizing mass.

In accordance with this invention, the useful viscous range is controllably extended by utilizing at least two promoter compounds, one of which has a lower activation temperature than the other. Preferably, the first low temperature promoter will be used in equal or lesser quantities than the second higher temperature promoter so that the polymerization will initially proceed slowly due both to the comparatively few active sites that are made available and due to the low activation temperature.

By including the second promoter, additional active polymerization sites are made available when the polymerization reaction is raised to the activation temperature of the second promoter. When this occurs, the reaction will measurably increase in speed due both to the increased number of additional polymerization sites and the higher temperature. Thus, it can be seen that the viscous range may be controllably extended by selecting the proper amount of the first promoter to be used and by selecting the first and second promoters to have a given difference in activation temperatures. Preferably, the first promoter should be used in comparatively small quantities (i.e., less than 1/200 molar based on the lactam, and more preferably, less than about 1/800 molar), and the two promoters should be selected to have activation temperatures that differ by at least 10° C., and preferably by at least 20° C.

As is well known, the polymerization of lactams is exothermic, and if there is sufficient of the first promoter present, the natural exotherm of the reaction will carry the reacting mass to a temperature at which the second promoter will become effective, and thereafter, due to the fact that the temperature has increased and many more active sites are made available for polymerization, the polymerization will carry rapidly to completion.

EXAMPLE I

A reactive mixture of e-caprolactam was prepared containing a 1/400 molar quantity of sodium caprolactam as a catalyst and 1/800 molar quantities each of tolylene diisocyanate and octadecylisocyanate as promoters.

100 milliliters of the above mixture were placed in a small flask having an internal diameter of 1¾". The beaker, in turn, was then placed in an oil bath maintained at 160° C.

When the temperature reached about 105° C., the reaction was activated by the octadecylisocyanate as noted by an increased rate of temperature rise of the monomer. At the same time, an increase in the viscosity of the lactam monomer was observed. The viscosity gradually continued to increase along with the temperature until the reacting mass reached a temperature of about 155° C., at which time the second promoter, that is, the tolylene diisocyanate, reached its activation temperature, and thereafter the reaction went rapidly to completion. The time of the viscous range was about 80 seconds.

EXAMPLE II

The above experiment was repeated; however, the low temperature promoter, octadecylisocyanate, was not included. While the same amount of catalyst was used, it was necessary to increase the quantity of the tolylene diisocyanate to about 1/200 molar in order to provide sufficient initiator to insure completion of the reaction. No reaction was noted until a temperature of about 155° C. was reached, and the reaction then proceeded rapidly to completion. The time of the viscous range was about 15 seconds.

I claim:
1. In a method for increasing the time of the viscous range during the low temperature anionic polymerization of higher lactams in which a reactive polymerization mixture is prepared comprised of a lactam, an anionic polymerization catalyst for the lactam, and a first and a second promoter that are effective to cause the anionic polymerization of the lactam, the improvement comprising:
    using as the first promoter a promoter that will be effective at a first temperature to enable the polymerization reaction to proceed autogenously under substantially adiabatic conditions, which first temperature is at least 10° C. below a second temperature at which the second promoter will be so effective;
    initiating the polymerization by heating the reactive mixture to the first temperature;
    increasing the rate of the polymerization reaction by permitting the temperature of the polymerizing reactive mixture to increase to at least 10° C. above the first temperature and at least to the second temperature whereby additional polymerization sites are made available by the second promoter; and
    permitting the polymerization reaction to proceed substantially to completion.
2. A method according to claim 1 wherein the first and the second temperatures differ by at least 20° C.
3. A method according to claim 1 wherein the first promoter will be effective to enable the polymerization reaction to proceed autogenously under substantially adiabatic conditions at a temperature in a range of from about 105° C. to about 130° C.
4. A method according to claim 3, wherein the first promoter is an aliphatic isocyanate.
5. A method according to claim 4, wherein the aliphatic isocyanate is octadecylisocyanate.
6. A method according to claim 1, wherein the first and the second promoters are isocyanates.
7. A method according to claim 6, wherein the second promoter is an aromatic isocyanate.
8. A method according to claim 7, wherein the aromatic isocyanate is at least difunctional.
9. A method according to claim 8, wherein the second promoter is tolylene diisocyanate.
10. A method according to claim 1, wherein the second promoter compound is a urea or a urethane.
11. A method according to claim 1, wherein the viscous range extends from about 20 to about 400 poise.

References Cited

UNITED STATES PATENTS

| 3,015,652 | 2/1962 | Schnell et al. | 260—78 |
| 3,028,369 | 4/1962 | Butler et al. | 260—78 |
| 3,037,003 | 5/1962 | Griehl | 260—78 |
| 3,057,830 | 10/1962 | Corbin | 260—78 |
| 3,121,768 | 2/1964 | Boyer | 260—78 |
| 3,138,574 | 6/1964 | Kohan | 260—78 |
| 3,234,152 | 2/1966 | Fuller | 260—78 |

WILLIAM H. SHORT, *Primary Examiner.*

H. D. ANDERSON, *Assistant Examiner.*